3,050,489
METHOD OF STABILIZING OXIDIZED DRYING OILS FOR ISOCYANATE-SULPHUR DIOXIDE CURING

Ober C. Slotterbeck, Rahway, and Merilyn T. Winters, Westfield, N.J., assignors to Esso Research and Engineering Company, a corporation of Delaware
No Drawing. Filed Mar. 26, 1958, Ser. No. 723,971
6 Claims. (Cl. 260—33.4)

The present invention relates to the stabilization of synthetic oxidized polymeric drying oils and more particularly to the method of adding an alcohol to stabilize these drying oils before curing.

In the past, it has been necessary to stabilize oxidized drying oils in order to prevent gel formation and to prevent large increases in viscosity after comparatively short storage periods. Previously, stabilization has been accomplished by the addition of a liquid saturated alcohol to the drying oil solution. The alcohols used were the primary and secondary alcohols with the secondary alcohols, e.g. isopropyl alcohol, being preferred.

Furthermore, it is also known in the prior art to mix oxidized drying oils with blocked isocyanates in order that surface films applied therefrom could be cured in a relatively short time to give hard, chemically resistant coatings. This hardness results from the cross-linking of the isocyanates with the hydroxy groups of the drying oils. Unfortunately, however, no alcohol can be added to stabilize the drying oil. If primary or secondary alcohols are incorporated, the isocyanates would react with the alcohol in preference to the hydroxy groups of the oxidized drying oil. Thus, a serious disadvantage is encountered since it is not possible to stabilize the oxidized drying oil without hindering the reactivity or effectiveness of the cross-linking agent, e.g. polyisocyanate.

It has now been discovered that this disadvantage can be overcome by using a tertiary alcohol rather than the primary or secondary alcohol, for the polyisocyanates will react with the oxidized drying oil in preference to the tertiary alcohol. Therefore, it is now possible to both stabilize and cross-link the oxidized oil.

In accordance with this invention, the synthetic oxidized polymeric drying oil is first stabilized with a tertiary alcohol and then blended with blocked isocyanates. This mixture is then applied to a surface, and the film therefrom is cured, alone or in conjunction with sulfur dioxide, to a hard, chemically resistant coating.

Synthetic drying oils used in this invention are the conjugated diolefins having 4 to 6 carbon atoms per molecule, as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring (paramethyl styrene, dimethyl styrene, etc.), may also be used. Such synthetic oils may be prepared by mass polymerization, either in the presence of a hydrocarbon soluble peroxide catalyst or in the presence of metallic sodium. An especially preferred drying oil is one prepared by reacting 75 to 85 parts of butadiene and 25 to 15 parts of styrene to form a copolymer utilizing metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C. in amounts ranging from 100 to 500 parts per 100 parts of monomers; preferred diluents are aliphatic hydrocarbons such as solvent naphtha or straight-run mineral spirits such as Varsol (boiling range from 150° to 200° C.). A codiluent, about 10 to 45 parts per 100 parts of monomers, may be used, said codiluent consisting of a $C_4$ to $C_8$ aliphatic ether or cyclic ethers and polyethers other than those having a —O—C—O— grouping. A typical example is dioxane 1,4. Finally, it is beneficial to use about 5 to 35 weight percent (based on sodium) of an alcohol such as methanol, isopropanol, or an amyl alcohol. The preparation of this drying oil is described in U.S. Patent No. 2,762,851, the subject matter of which is incorporated herein by reference for further details.

These polymeric drying oils are then oxidized by blowing them with air or oxygen, preferably in the presence of a solvent, as aromatic solvents or solvent mixtures having a kauri butanol value of at least 50. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthanates, octonates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

The stabilizing agent, within the purview of this invention, can be any tertiary alcohol, but tertiary butanol is preferred. The amount of alcohol added to the oxidized polymer solution may be from about 1% to about 35%, preferably about 5 to 30%. Above 35%, the polymer will precipitate since the alcohol is not a solvent for the oxidizing polymer. Below 1%, an immediate viscosity increase will occur. Temperature and pressure are not critical in this mixing process; therefore, room temperature and atmospheric pressure are satisfactory.

According to this invention, the polymer and tertiary alcohol mixture is then blended with blocked isocyanates. These blocked isocyanates are prepared by reacting a compound containing a plurality of available isocyanate groups and a compound containing a plurality of hydroxyl groups or other polyfunctional compounds containing an active hydrogen. The polyisocyanates satisfactory for this invention include aryl isocyanates, such as tolylene diisocyanate-2,4; 3,3′-bitolylene, 4,4′-diisocyanate; and diphenylmethane 4,4-diisocyanate, as well as alkyl isocyanates such as hexamethylene diisocyanate. The isocyanate should contain at least two isocyanate groups and may have as many as four such groups, although it is preferred to use di- and triisocyanates. Suitable hydroxyl compounds include glycerol, trimethylolethane, trimethylol propane or higher homologs thereof and pentaerythritol. For example, 2,4 or 2,6-tolylene diisocyanate may be reacted with trimethylolpropane according to the following equation:

$$3C_6H_3.CH_3.(NCO)_2 + CH_3CH_2C(CH_2OH)_3$$
$$\rightarrow CH_3CH_2C(CH_2O.CO.NH.C_6H_3.CH_3.NCO)_3$$

The reaction is not limited to the above compounds but is applicable to all types of isocyanates and polyols having the formula $R(NCO)_n$ and $R'(OH)_n$ where R and R′ are alkyl, aryl, and alkaryl groups and $n$ is any integer above 1. The polyisocyanates should be added to the oxidized oil to result in a final composition of between about 0.0007 and 0.0183 gram equivalents of free-NCO per 5 grams of oxidized oil. Room temperature and atmospheric pressure are satisfactory, although not critical, for carrying out this blending procedure.

This blended mixture of oxidized oil, tertiary alcohol, and polyisocyanates can then be applied as a film to the desired surface and cured alone or in the presence of sulfur dioxide. The sulfur dioxide, if included, should be in contact with the coated surface for a period of time from about 2 to 30 minutes. For example, if an underground pipeline has been coated with the blended mixture, the gaseous sulfur dioxide can be pumped inside and kept in contact with the coated surface for about 20 to 30 minutes.

In accordance with this invention, after the surface has been coated, the film therefrom is cured regardless of whether it has or has not been in contact with sulfur dioxide. This curing can be accomplished by air drying at about room temperature for about 20 to 240 minutes. The curing can also be accomplished by baking at a temperature between about 140° and 250° F. for about 30 to 10 minutes.

The coating which results from this invention is hard and chemically resistant, and it is superior to one in which the drying oil was stabilized with a secondary rather than a tertiary alcohol. The tertiary alcohol does not hinder the reactivity or effectiveness of the cross-linking agent, e.g., polyisocyanates. Since this hinderance does not occur, the oxidized drying oil can also be stabilized; therefore, gel formation and viscosity increase are alleviated. Thus, through the utilization of this invention, it is now possible to both stabilize an oxidized drying oil and to produce a hard, chemically resistant film therefrom by the addition of polyisocyanates.

The following examples are submitted to illustrate and not to limit this invention.

*Example I*

A butadiene-styrene drying oil was prepared from the following charge:

| | Parts |
|---|---|
| Butadiene-1,3 | 75 |
| Styrene | 25 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene 100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poises at 50% N.V.M. in Varsol solution and the non-volatile portion thereof had an average molecular weight of about 3,000.

The polymeric drying oil was dissolved in Solvesso 150 (high percentage of aromatics with an API gravity of 30.2, a flash point of 118° C., and a boiling range of 322°–351° F.) to make a 35% N.V.M. solution. It was then blown with air at about 230° F. until the oxygen content in the structure reached 18%.

Solutions were prepared utilizing three different solvents and the copolymer of 75% butadiene and 25% styrene with 18% oxygen in its structure. Viscosity measurements were taken at a temperature of 77° F. over a period of 12 days using Gardner viscosity tubes. The specific solutions and the results of the test are indicated below:

Solution A: Oxidized copolymer, 65.3% NVM — Solvent: 30% Tertiary butanol, 70% Solvesso-100
Solution B: Oxidized copolymer, 51.1% NVM — Solvent: 30% tertiary butanol, 70% Solvesso-100
Solution C: Oxidized copolymer, 47.5% NVM — Solvent: 100% Solvesso-100

| | A | B | C | Number of days |
|---|---|---|---|---|
| Viscosity (poise) | 31.6 | 4.18 | 4.90 | 0 |
| | 31.6 | 4.18 | 5.00 | 1 |
| | 33.9 | 4.35 | 5.34 | 4 |
| | 33.9 | 4.35 | 5.50 | 7 |
| | 36.2 | 4.59 | 5.77 | 12 |
| Average change (poise/day) | 0.38 | 0.03 | 0.07 | |

*Example II*

Solution A in Example I was blended with the reaction product of 2,4-tolylene diisocyanate and trimethylolpropane (3/1 mole ratio) containing various —NCO equivalents, and surfaces were coated at various thicknesses and subjected to a sulfur dioxide cure at a temperature of 77° F. for 30 minutes.

| Equivalents —NCO per 10.0 grams solids | Thickness (mils) | Sward hardness |
|---|---|---|
| 0.0021 | 2.3 | 10 |
| 0.0041 | 2.2 | 14 |
| 0.0062 | 2.5 | 20 |
| 0.0083 | 2.2 | 28 |
| 0.0165 | 2.2 | 40 |
| 0.0308 | 4.0 | 38 |

Examples I and II indicate that with tertiary butanol it is possible both to stabilize and cross-link the drying oil.

*Example III*

The following solutions were prepared from the oxidized copolymer of Example I.

Solution F: Oxidized copolymer, 46.1% NVM — Solvent: 30% secondary butanol, 70% Solvesso-100
Solution G: Oxidized copolymer, 46.1% NVM — Solvent: 30% tertiary butanol, 70% Solvesso-100

The solutions were mixed with the reaction product of 2,4-tolylene diisocyanate and trimethylolpropane (3/1 mole ratio) and surfaces were coated at various thicknesses and subjected to a sulfur dioxide cure at a temperature of 77° F. for 30 minutes.

| Coating from solution | Equivalents —NCO per 10 grams solids | Thickness (mils) | Sward hardness |
|---|---|---|---|
| F | 0.0046 | 3.6 | 8 |
| F | 0.0115 | 4.5 | 14 |
| F | 0.0182 | 3.5 | 24 |
| G | 0.0046 | 4.2 | 10 |
| G | 0.0115 | 4.3 | 18 |
| G | 0.0182 | 3.4 | 28 |

This example indicates that a superior coating is obtained by using a tertiary alcohol to stabilize the drying oil.

*Example IV*

The solutions of F and G of Example III were mixed with 0.0046 equivalent per 10 grams solids of the reaction product of 2,4-tolylene diisocyanate and trimethylolpropane (3/1 mole ratio), and the differences in reactivity are indicated below. Viscosity measurements were taken at 77° F. as function of time.

| With solution | Viscosity (poise) | | | | | |
|---|---|---|---|---|---|---|
| | 15 min. | 155 min. | 20 hr. | 44 hr. | 75 hr. | 164 hr. |
| F | 1.17 | 1.32 | 1.82 | 1.82 | 2.00 | 2.00 |
| G | 1.35 | 2.00 | 8.80 | 10.70 | 11.8 | 12.2 |

This example shows that in G the isocyanate is reacting preferentially with the polymeric drying oil rather than the tertiary alcohol.

In F, the isocyanate reacts with the secondary alcohol instead of the drying oil.

*Example V*

The following solutions were prepared from the oxidized polymer of Example I.

Solution H: Oxidized copolymer, 46.1% NVM  Solvent: 30% of n-amyl alcohol, 70% of Solvesso-100
Solution J: Oxidized copolymer, 46.1% NVM  Solvent: 30% of 3-pentanol, 70% Solvesso-100
Solution K: Oxidized copolymer, 46.1% NVM  Solvent: 30% tert-amyl alcohol, 70% Solvesso-100

The solutions were mixed with the reaction product of 2,4-tolylene diisocyanate and trimethylolpropane (3/1 mole ratio) and surfaces were coated to various thicknesses and subjected to a sulfur dioxide cure at a temperature of 77° F. for 30 minutes.

| With solution | Equivalents—NCO per 10 grams solids | Thickness (mils) | Sward hardness |
|---|---|---|---|
| H | 0.0046 | 2.7 | 10 |
| H | 0.0115 | 3.5 | 10 |
| J | 0.0046 | 3.0 | 8 |
| J | 0.0115 | 3.6 | 14 |
| K | 0.0046 | 3.2 | 10 |
| K | 0.0115 | 4.3 | 18 |

*Example VI*

The following solutions were prepared from the oxidized polymer of Example I.

Solution L: Oxidized copolymer, 46.1% NVM  Solvent: 30% of n-hexyl alcohol, 70% Solvesso-100
Solution N: Oxidized copolymer, 46.1% NVM  Solvent: 30% 2-hexanol, 70% Solvesso-100
Solution O: Oxidized copolymer, 46.1% NVM  Solvent: 30% 2-methyl-2-pentanol, 70% Solvesso-100

The solutions were mixed with the reaction product of 2,4-tolylene diisocyanate and trimethylolpropane (3/1 mole ratio) and surfaces were coated to various thicknesses and subjected to a sulfur dioxide cure at a temperature of 77° F. for 30 minutes.

| With solution | Equivalents—NCO per 10 grams solids | Thickness (mils) | Sward hardness |
|---|---|---|---|
| L | 0.0046 | 2.7 | 4 |
| L | 0.0115 | 2.6 | 8 |
| N | 0.0046 | 2.8 | 6 |
| N | 0.0115 | 4.3 | 8 |
| O | 0.0046 | 3.4 | 12 |
| O | 0.0115 | 4.2 | 16 |

Examples V and VI indicate that other tertiary alcohols give superior results and in general that all tertiary alcohols fall within the purview of this invention.

To summarize, the above examples indicate that tertiary alcohol is effective as a stabilizing agent for a drying oil. The examples also indicate that a drying oil and tertiary alcohol blended with a polyisocyanate, when applied as a film to a surface and cured, will result in a hard, resistant coating. It should be noted that it is critical to use a tertiary alcohol to obtain the unexpected and superior results of this invention since primary and secondary alcohols will hamper the effectiveness of the polyisocyanates.

Having described the general nature and specific embodiments of the present invention, the true scope is now particularly pointed out in the appended claims.

What is claimed is:

1. A viscosity stable coating composition comprising a synthetic oxidized polymer, said polymer being a normally liquid polymer of a conjugated diolefin having 4 to 6 carbon atoms per molecule, from about 1 to about 35% by weight, based on the polymer, of a tertiary aliphatic monohydric alcohol, and the reaction product of an isocyanate and a polyol having the formulae $R(NCO)_n$ and $R'(OH)_n$, respectively, wherein R and R' are selected from the group consisting of alkyl, aryl and alkaryl and $n$ is any integer above 1; said composition having between about 0.0007 and about 0.0183 gram equivalents of free-NCO per 5 grams of said oxidized polymer.

2. A composition as in claim 1 wherein the synthetic oxidized polymer is a copolymer of butadiene and styrene.

3. A composition as in claim 2 wherein the tertiary aliphatic monohydric alcohol is tertiary butanol.

4. A process which comprises stabilizing synthetic oxidized polymer, said polymer being a normally liquid polymer of a conjugated diolefin having 4 to 6 carbon atoms per molecule, with from about 1 to about 35% by weight, based on the polymer, of a tertiary aliphatic monohydric alcohol and mixing the resultant viscosity stabilized solution with the reaction product of an isocyanate and a polyol having the formulae, $R(NCO)_n$ and $R'(OH)_n$, respectively, wherein R and R' are selected from the group consisting of alkyl, aryl, and alkaryl and $n$ is any integer above 1, the resultant composition having between about 0.0007 and about 0.0183 gram equivalents of free-NCO per 5 grams of oxidized polymer.

5. A process as in claim 4 wherein the oxidized polymer is a copolymer of butadiene and styrene.

6. A process as in claim 5 wherein the tertiary aliphatic monohydric alcohol is tertiary butanol.

References Cited in the file of this patent

UNITED STATES PATENTS

| 2,674,586 | Welch | Apr. 6, 1954 |
| 2,683,728 | Mastin et al. | July 13, 1954 |
| 2,701,780 | Nelson et al. | Feb. 8, 1955 |
| 2,778,810 | Miller | June 27, 1957 |
| 2,815,296 | Young et al. | Dec. 3, 1957 |
| 2,908,585 | Koenecke | Oct. 13, 1959 |
| 2,942,996 | McKay et al. | June 28, 1960 |
| 2,968,648 | Tucker | Jan. 17, 1961 |

FOREIGN PATENTS

| 150,416 | Australia | May 3, 1951 |
| 773,897 | Great Britain | May 1, 1957 |
| 852,882 | Germany | Oct. 20, 1952 |

OTHER REFERENCES

"Chemistry of Organic Isocyanates," E. I. du Pont de Nemours and Co., Wilmington, Delaware. Hr-2 Jan. 20, 1956. (Copy in Div. 60.)